(12) United States Patent
Rawlings et al.

(10) Patent No.: US 6,191,248 B1
(45) Date of Patent: *Feb. 20, 2001

(54) COATING

(75) Inventors: Diane C. Rawlings, Bellevue; Larry K. Olli, Seattle; G. Micheal Granger, Redmond; Kevin R. Malone, Tacoma, all of WA (US)

(73) Assignee: The Boeing Company, Seattle, WA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

This patent is subject to a terminal disclaimer.

(21) Appl. No.: 08/994,899

(22) Filed: Dec. 19, 1997

Related U.S. Application Data

(63) Continuation-in-part of application No. 08/770,606, filed on Dec. 19, 1996, now Pat. No. 5,874,167.
(60) Provisional application No. 60/033,638, filed on Dec. 20, 1996.

(51) Int. Cl.[7] .................................................. C08G 18/32
(52) U.S. Cl. .......................... 528/68; 524/871; 428/423.1
(58) Field of Search ............................... 528/68; 524/571; 428/423.1

(56) References Cited

U.S. PATENT DOCUMENTS

| | | | |
|---|---|---|---|
| 3,148,173 | 9/1964 | Axelrood | 528/49 |
| 3,525,717 | 8/1970 | Butler et al. | 525/440 |
| 3,789,045 | 1/1974 | Coury et al. | 528/45 |
| 3,991,026 | 11/1976 | Matsuda et al. | 523/309 |
| 4,009,307 | * 2/1977 | Erikson et al. | 427/377 |
| 4,686,242 | 8/1987 | Turner et al. | 521/137 |
| 4,863,516 | 9/1989 | Mosser et al. | 106/14.12 |
| 5,064,468 | * 11/1991 | Okai et al. | 106/2 |
| 5,261,955 | * 11/1993 | Nadkarni | 106/404 |
| 5,322,560 | 6/1994 | DePue et al. | 106/404 |
| 5,372,638 | 12/1994 | DePue et al. | 106/404 |
| 5,480,481 | 1/1996 | Setoguchi et al. | 106/404 |
| 5,739,194 | 4/1998 | Natesh et al. | 525/127 |
| 5,874,167 | * 2/1999 | Rawlings et al. | 428/402 |

FOREIGN PATENT DOCUMENTS 26 30 013   1/1978  (DE).

OTHER PUBLICATIONS

Encyclopedia of Polymer Science, p. 289, vol. 13, 1988.*

* cited by examiner

Primary Examiner—Rachel Gorr
(74) Attorney, Agent, or Firm—John C. Hammar

(57) ABSTRACT

Thin film metal particulates are removed from FEP sheetstock cheaply and quickly by immersing the coated FEP first in a base and then in an acid. Occasionally, ultrasonic vibration of the FEP may also be required. The particulates are useful as paint pigments when isolated and conversion coated. The FEP is reusable. A preferred binder for carrying the pigments is a two-component system having a tetraketimine and an isocyanate.

18 Claims, No Drawings

COATING

REFERENCE TO RELATED APPLICATION

This application claims the benefit of U.S. Provisional Patent Application 60/033,638, filed Dec. 20, 1996.

This Application also is a continuation-in-part Application based upon U.S. Application 08/770,606, filed Dec. 19, 1996, now U.S. Pat. No. 5,874,167.

TECHNICAL FIELD

The present invention relates to a coating made from novel thin film metal pigments and a novel urethane binder.

BACKGROUND OF THE INVENTION

Thin film metal particulates are expensive, because existing process to make them, like those described in U.S. Pat. Nos. 4,879,140 or 5,100,599, use exotic equipment such as plasma generators or vacuum chambers, or are labor intensive, small scale processes like photolithography. The prior art particulates are not readily produced in reasonable volume, and cost as much as $5,000/oz. At these prices, paints that use the particulates as the pigment are only suitable for highly specialized applications. There is a need for a lower cost, higher volume process for rapidly and reliably making thin film metal particulates usable as paint pigments.

U.S. Pat. No. 5,895,524 describes an inexpensive method to rapidly manufacture thin film metal particulates usable as paint pigments. The method involves immersing a metallized sheet of fluorinated ethylene propylene (FEP) first in an aqueous base and then in an aqueous acid to loosen and release the metal from the FEP. The particulates are brushed from the FEP into the acid tank, and are recovered. The FEP is reusable. The particulates are usually aluminum or germanium metal having a thickness of about 900 to 1100 Å, and preferably, 1000 Å.

The method may also include ultrasonically vibrating the metallized sheet following the immersions.

For making aluminum particulates, the preferred base is 7% $Na_2CO_3$ and the preferred acid is 0.01–0.1 N acetic acid. For making germanium particulates, the preferred base is 2.5 N NaOH, since this metal is harder to loosen from the FEP. The acid bath neutralizes the basic reaction between the metal film and base.

SUMMARY OF THE INVENTION

The present invention uses the high efficiency metal pigments of U.S. Pat. No. 5,895,524 and U.S. Pat. No. 5,874,167 in combination with a novel binder. The binder is a two-component system having a tetraketimine (or the corresponding tetraamine) and an isocyanate with a solvent as necessary for application. Preferably both the tetraketimine and the isocyanate are aliphatic or alicyclic, free of hydrocarbon unsaturation, and of appreciable molecular weight to provide toughness and durability to the coating. The pigments, of which the high efficiency pigments are one or the only pigment, comprise 1–50 wt. % and, generally, 40–50 wt. % of the coating. We mix the pigment with the tetraketimine and only mix the tetraketimine and the isocyanate at the time of application. The tetraketimine is generally made by condensing a diisocyanate with a triamine having two, blocked primary amines and one free secondary amine.

DETAILED DESCRIPTION OF THE INVENTION

U.S. Pat. No. 5,895,524 describes a low cost, reasonably high volume method for making thin film aluminum or germanium particulates. We incorporate this application by reference. The particulates are useful as pigments in paint, but their current costs of as much as $5,000/oz restricts their adoption. Preferred particulates are essentially pure metals (with suitable surface conversion coatings) having a thickness of about 1000 Å±5–10% (i.e., about 900–1100 Å, and preferably, about 950–1050 Å). The particulates otherwise should meet the conventional specifications for paint pigments. In that regard the particulates (also sometimes called flakes) must be thick enough to provide opacity while producing minimum edge effects (scattering). A characteristic dimension, then, for either the length or width would be 20–100 $\mu$m, and, preferably, 30–50 $\mu$m. We target, then, particulates of characteristic nominal dimensions of 50 $\mu$m×50 $\mu$m×1000 Å (i.e. 1 $\mu$m).

Films useful for forming the high efficiency pigments of the desired thickness can be prepared by sputtering the metal onto two mil thick fluorinated ethylene propylene (PEP) sheetstock. Making this film product is done according to the conventional processing steps for making food or vacuum bagging materials. The method of the present invention removes the metal from the metalled film in two, simple and quick immersion steps. First, the metallized roll is immersed in a caustic (basic) bath for about 15 sec to loosen the metal. Then, we immerse the roll again for about 15 sec in a dilute acid solution to neutralize the base and to separate the metal. We brush the particulates from the FEP, and precipitate the particulates in the acid solution prior to filtering, rinsing, and drying.

To separate the metal from the FEP we generally contact the metal with one or more counter rotating cylindrical nylon bristle brushes. We sometimes use ultrasonic vibration alone or in combination with the brushing.

For aluminum thin films, we prefer to use 7 wt %. $Na_2CO_3$ as the base, but can use $NaHCO_3$, $NaCO_3/NaHCO_3$ mixtures, or conventional alkaline or alkaline earth hydroxides diluted to about a pH of 9.0. The acid solution preferably is 0.01–0.1 N acetic acid at pH 3.4–3.6, but could be phosphoric acid or a dilute mineral acid.

For germanium thin films, we prefer to use 2.5 N NaOH as the base with acetic acid or with ultrasonic vibration replacing the acid solution.

For brushes, we prefer 3 inch nylon bristle (0.010) diameter) spiral wound brushes available from Richards Brush Company.

The base immersion takes about 15 seconds. Prior to the acid immersion, we allow the base-treated metaled film to be exposed to air for about 25 seconds. The acid immersion lasts about 15 seconds before we brush the particulates from the FEP. We tow the metallized roll through the several operations in a continuous process, as will be understood by those of ordinary skil.

We monitor the pH of the acid tank with conventional pH or ORP meters and add acid as necessary to maintain the desired pH and redox potential.

We recover the particulates from the acid bath by filtering, rinsing, and drying. We size the particulates. Then, we conversion coat the particulates using conventional aluminum treatments like chromic acid anodizing, phosphoric acid anodizing, alodine (chromate) treating (particularly using either alodine 600 or alodine 1200); cobalt-based conversion coating as described in Boeing's U.S. Pat. Nos. 5,298,092; 5,378,293; 5,411,606; 5,415,687; 5,468,307; 5,472,524; 5,487,949; and 5,551,994; or sol coating. The sol coating method creates a sol-gel film on the surface using a hybrid organozirconium and organosilane sol as described in Boeing's U.S. Pat. No. 5,849,110 titled "Sol Coating of Metals" or the paper: Blohowiak, et al. "Durable Sol-Gel Surface Preparations for Repair and Remanufacture of Aircraft Structures," DoD/FAA/NASA Conf. On Aging Aircraft Proc., Jul. 8–10, 1997, Ogden, Utah. We incorporate by reference these Boeing patents and paper.

The different treatments can impart different tint to the pigment. Alodine imparts a yellow or greenish-yellow tint. The cobalt treatments impart blue tints.

The sol coating is preferably a mixed metal wherein zirconium bonds to the aluminum flake covalently while the organic tail of an organosilane bonds with the paint binder. The anodizing treatments prepare the surface to achieve adhesion primarily by mechanical surface phenomena. The sol coating provides both mechanical adhesion (surface microroughening) and adhesion through chemical affinity, compatibility, and covalent chemical bonds.

Other pigments that might be used alone or in conjunction with the high efficiency pigments are described in the CRC Handbook of Chemistry & Physics, 51st Ed., F-60–F-62 (1970). The novel binder is compatible with any pigment, we believe.

The binder preferably is a two-component system using an aliphatic or alicyclic tetraketimine or its corresponding tetraamine and an isocyanate. A particularly preferred binder system is described in U.S. Pat. No. 6,008,410, entitled "Ketimine," by Larry Olli, which we incorporate by reference. We prefer aliphatic or alicyclic components of appreciable molecular weight. The tetraketimine can be made by blocking primary amines with a ketone to form ketimine linkages on a polyamine having two primary amines and a secondary amine and then reacting the blocked ketimine with an isocyanate, as more fully described in the Olli application. The polyamine typically is:

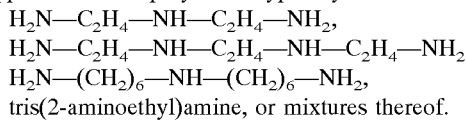

tris(2-aminoethyl)amine, or mixtures thereof.

The polyisocyanate is preferably a diisocyanate. It can be any readily commercially available isocyanate, such as triaminononane trisisocyanate (TAN, which is most commonly referred to as 4-aminomethyl-1,8-diaminooctane), hexamethylenediisocyanate (HDI), HDI trimers, such as Desmodur N-3300® from Miles, Luxate HT2000® from Olin, or Tolonate HDT® from Rhone-Poulenc, 2-Heptyl-3,4-bis(9-isocyanatononyl)-1-pentylcyclohexane and other $C_{,12}$ to $C_{36}$ aliphatic and alicyclic diisocyanates, meta-tetramethylxylyenediisocyanate, hydrogenated methylene-bisphenylene diisocyanate, isophorone diisocyanate (IPDI-Trimer), and the like, or mixtures thereof For purposes of this description, "coating" means both the cured film on a substrate and the paint or varnish used to prepare the coating, unless the context dictates otherwise.

The coatings often include other additives to provide desired characteristics for the coated substrate, including color, gloss, reflectivity, and the like.

While we have described preferred embodiments, those skilled in the art will readily recognize alterations, variations, and modifications that might be made without departing from the inventive concept. Therefore, interpret the claims liberally with the support of the full range of equivalents known to those of ordinary skill based upon this description. The examples illustrate the invention and are not intended to limit it. Accordingly, define the invention with the claims and limit the claims only as necessary in view of the pertinent prior art.

We claim:

1. A coating formulation adapted to cure to a durable and tough polyurea, free of hydrocarbon unsaturation, comprising a two-component binder having:
   (a) an alicyclic polyurea polyketimine having appreciable molecular weight to provide toughness and durability to the coating and at least four ketimine functionalities;
   (b) an alicyclic isocyanate in substantially stoichiometric proportions with the polyketimine; and
   (c) about 1–50 wt % of a pigment to provide the desired color, gloss, or reflectivity, the pigment including an effective amount of metal flakes to provide opacity with minimum edge effects (i.e., scattering).

2. A coating formulation adapted to cure to a durable and tough polyurea, free of hydrocarbon unsaturation, comprising a two-component binder having:
   (a) an alicyclic polyurea polyketimine having at least four ketimine functionalities;
   (b) 2-Heptyl-3,4-bis (9-isocyanatononyl)-1-pentylcyclohexane in substantially stoichiometric proportions with the polyketimine; and
   (c) about 1–50 wt % of a pigment to provide the desired color, gloss, or reflectivity.

3. The coating of claim 2 wherein the pigment is a high efficiency pigment made in accordance with a method described in U.S. Pat. No. 5,874,167 by:
   (a) depositing metal onto a sheet of fluorinated ethylene propylene (FEP sheetstock to form a thin film;
   (b) immersing the coated FEP in a base to loosen the thin film from the FEP;
   (c) immersing the loosened thin film on the FEP in an acid to neutralize the base and to remove the thin film metal in particulate form;
   (d) isolating the particulates; and
   (e) applying conversion coatings to the particulates to produce metal pigments.

4. A coating formulation adapted to cure to a durable and tough polyurea, free of hydrocarbon unsaturation, comprising a two-component binder having:
   (a) an alicyclic polyurea polyketimine having at least four ketimine functionalities;
   (b) an alicyclic isocyanate in substantially stoichiometric proportions with the polyketimine; and
   (c) about 1–50 wt % of a pigment to provide the desired color, gloss, or reflectivity
      wherein the polyketimine is prepared by:
         (a) protecting primary amine functionalities on an aliphatic polyamine having at least one secondary amine and terminal primary amines with ketimine linkages, and
         (b) reacting the secondary amine of at least two protected polyamines from step (a) with 2-Heptyl-3,4-bis(9-isocyanatononyl)-1-pentylcyclohexane to form urea linkages, wherein the polyamine is:
            $H_2N\text{—}C_2H_4\text{—}NH\text{—}C_2H_4\text{—}NH_2$,
            $H_2N\text{—}C_2H_4\text{—}NH\text{—}C_2H_4\text{—}NH\text{—}C_2H_4\text{—}NH_2$
            $H_2N\text{—}(CH_2)_6\text{—}NH\text{—}(CH_2)_6\text{—}NH_2$,
            or mixtures thereof.

5. A coating formulation adapted to cure to a durable and tough polyurea, free of hydrocarbon unsaturation, comprising a two-component binder having:
   (a) an alicyclic polyurea polyketimine having at least four ketimine functionalities;
   (b) an isocyanate in substantially stoichiometric proportions with the polyketimine; and (c) about 1–50 wt % of a pigment to provide the desired color, gloss, or reflectivity
wherein the polyketimine is prepared by:
(a) protecting primary amine functionalities on an aliphatic polyamine having at least one secondary amine and terminal primary amines with ketimine linkages, and
(b) reacting the secondary amine of at least two protected polyamines from step (a) with 2-Heptyl-3,4-bis(9-isocyanatononyl)-1-pentylcyclohexane to from urea linkages, wherein the polyamine is:
$H_2N\text{—}C_2H_4\text{—}NH\text{—}C_2H_4\text{—}NH_2$,
$H_2N\text{—}C_2H_4\text{—}NH\text{—}C_2H_4\text{—}NH\text{—}C_2H_4\text{—}NH_2$
$H_2N\text{—}(CH_2)_6\text{—}NH\text{—}(CH_2)_6\text{—}NH_2$,
or mixtures thereof, and
wherein the isocyanate is:
triaminononane trisisocyanate, hexamethylenediisocyanate (HDI), HDI trimers, 2Heptyl-3,4-bis(9-isocyanatononyl)-1-pentylcyclohexane, a $C_{12}$ to $C_{36}$ aliphatic or alicyclic diisocyanate, meta-tetramethylxylyenediisocyanate, hydrogenated methylene-bisphenylene diisocyanate, isophorone diisocyanate, or mixtures thereof.

6. The coating formulation of claim 3 wherein the pigment comprises 40–50 wt %.

7. An article coated with the cured coating of claim 2.

8. A method for making a polyurea coating, comprising the steps of:
combining at least one saturated alicyclic polyketimine having at least two urea linkages formed by reacting an amine with an alicyclic isocyanate, at least one aliphatic or alicyclic diisocyanate selected from $C_{12}$ to $C_{36}$ diisocyanates or 2-Heptyl-3,4-bis(9-isocyanatononyl)-1-pentylcyclohexane, and 40–50 wt % of suitable pigments, including an effective amount of metal flakes in the size range of about 900–1100 Å×30–50 µm×30–50 µm, the flakes and pigments to provide color, gloss, or reflectivity, the flakes being thick enough to provide opacity while producing minimum edge effects (i.e., scattering), the amine, isocyanate and diisocyanate being of appreciable molecular weight to provide toughness and durability to the coating.

9. A method for making a polyurea coating comprising the steps of:
combining at least one saturated alicyclic polyketimine having at least two urea linkages formed by reacting an amine with an alicyclic isocyanate when preparing the polyketimine, at least one alicyclic isocyanate, and 40–50 wt % of suitable pigments to provide color, gloss, or reflectivity, the pigments including metal flakes in the size range of about 900–1100 Å×30–50 µm×30–50 µm to provide opacity with minimum edge effects,
wherein the polyketimine has at least four ketimine functionalities and is prepared by:
(a) protecting primary amine functionalities on an aliphatic polyamine selected from $H_2N\text{—}C_2H_4\text{—}NH\text{—}C_2H_4\text{—}NH_2$; $H_2N\text{—}C_2H_4\text{—}NH\text{—}C_2H_4\text{—}NH\text{—}C_2H_4\text{—}NH_2$; $H_2N\text{—}(CH_2)_6\text{—}NH\text{—}(CH_2)_6\text{—}NH_2$; or mixtures thereof, and
(b) reacting the secondary amine of the protected polyamine with an alicyclic polyisocyanate to form a urea linkage,
wherein the polyisocyanate in the polyketimine and the isocyanate are the same compound.

10. A method for making a polyurea coating, comprising the steps of:
combining at least one saturated alicyclic polyketimine having at least two urea linkages formed by reacting an amine with an alicyclic isocyanate when preparing the polyketimine, 2-Heptyl-3,4-bis(9-isocyanatononyl)-1-pentylcyclohexane, and 40–50 wt % of suitable pigments to provide color, gloss, or reflectivity, including an effective amount of metal flakes in the size range of about 900–1100 Å×30–50 µm×30–50 µm to provide opacity with minimum edge effects.

11. A method for making a polyurea coating, comprising the steps of:
combining a polyketimine free of hydrocarbon unsaturation having at least two urea linkages formed by reacting, when preparing the polyketimine, an amine with an isocyanate selected from the group consisting of:
triaminononane trisisocyanate, hexamethylenediisocyanate (HDI), HDI trimers, 2-Heptyl-3,4-bis(9-isocyanatononyl)-1-pentylcyclohexane, a $C_{12}$ to $C_{36}$ aliphatic or alicyclic diisocyanate, meta-tetramethylxylyenediisocyanate, hydrogenated methylene-bisphenylene diisocyanate, isophorone diisocyanate, or mixtures thereof,
at least one aliphatic or alicyclic isocyanate selected from the group consisting of:
triaminononane trisisocyanate, hexamethylenediisocyanate (HDI), HDI trimers, 2-Heptyl-3,4-bis(9-isocyanatononyl)-1-pentylcyclohexane, a $C_{12}$ to $C_{36}$ aliphatic or alicyclic diisocyanate, meta-tetramethylxylyenediisocyanate, hydrogenated methylene-bisphenylene diisocyanate, isophorone diisocyanate, or mixtures thereof,
and 40–50 wt % of suitable pigments to provide color, gloss, or reflectivity including an effective amount of metal flakes in the size range of about 900–1100 Å×30–50 µm×30–50 µm to provide opacity with minimum edge effects.

12. The method of claim 11 wherein the amine is selected from the group consisting of
$H_2N\text{—}C_2H_4\text{—}NH\text{—}C_2H_4\text{—}NH_2$,
$H_2N\text{—}C_2H_4\text{—}NH\text{—}C_2H_4\text{—}NH\text{—}C_2H_4\text{—}NH_2$
$H_2N\text{—}(CH_2)_6\text{—}NH\text{—}(CH_2)_6\text{—}NH_2$,
or mixtures thereof.

13. A polyurea coating formulation adapted to cure to a durable and tough polyurea, free of hydrocarbon unsaturation, comprising a two-component binder having:
(a) a polyurea polyketimine;
(b) an alicyclic isocyanate in substantially stoichiometric proportions with the polyketimine; and
(c) about 1–50 wt % of a pigment to provide the desired color, gloss, or reflectivity
wherein the polyketimine is made by reacting an isocyanate with a polyamine to form urea linkages, wherein the isocyanate in both the polyketimine and the formulation is:
2-Heptyl-3,4-bis(9-isocyanatononyl)-1-pentylcyclohexane,
and wherein the polyamine is:
Tris(2-aminoethyl)amine.

14. The formulation of claim 1 wherein the pigment includes aluminum or germanium metal having a thickness of about 900–1100 Å.

15. The formulation of claim 14 wherein the metal has a characteristic length of about 30–50 μm and a characteristic width of about 30–50 μm.

16. The formulation of claim 15 wherein the metal is aluminum and is protected with a conversion coating selected from the group consisting of chromic acid or phosphoric acid anodizing, alodine treating, or cobalt-based conversion coating.

17. The formulation of claim 15 wherein the metal contains a Si-Zr sol coating.

18. The coating formulation of claim 4 wherein the isocyanate is 2-Heptyl-3,4-bis(9-isocyanatononyl)-1-pentylcyclohexane.

* * * * *